(12) United States Patent
Redmer

(10) Patent No.: US 8,368,963 B2
(45) Date of Patent: Feb. 5, 2013

(54) METHOD FOR EXPOSING A PRINTING FORM AND CORRESPONDING COMPUTER PROGRAM PRODUCT

(75) Inventor: Eberhard Redmer, Ascheberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 591 days.

(21) Appl. No.: 12/624,625

(22) Filed: Nov. 24, 2009

(65) Prior Publication Data

US 2010/0128319 A1 May 27, 2010

(30) Foreign Application Priority Data

Nov. 24, 2008 (DE) .......................... 10 2008 058 719

(51) Int. Cl.
*H04N 1/409* (2006.01)
(52) U.S. Cl. .......................... 358/3.26; 358/1.9; 358/518
(58) Field of Classification Search .................. 358/1.1, 358/1.9, 2.1, 500, 501, 518, 535, 3.26
See application file for complete search history.

(56) References Cited

U.S. PATENT DOCUMENTS

| | | | |
|---|---|---|---|
| 4,725,966 A | 2/1988 | Darby et al. | |
| 6,024,504 A | 2/2000 | Weichmann et al. | |
| 6,895,862 B1 | 5/2005 | Ben-Chorin et al. | |
| 2006/0209320 A1* | 9/2006 | Ariga | 358/1.9 |

FOREIGN PATENT DOCUMENTS

| | | |
|---|---|---|
| DE | 19724066 A1 | 12/1998 |
| DE | 10110640 A1 | 10/2001 |

OTHER PUBLICATIONS

German Search Report dated Jun. 2, 2009.

* cited by examiner

*Primary Examiner* — Thomas D Lee
(74) *Attorney, Agent, or Firm* — Laurence A. Greenberg; Werner H. Stemer; Ralph E. Locher

(57) ABSTRACT

A method for exposing a printing form includes the following steps: A matrix having device-dependent image information is provided on a computer for supplying data to a printing form exposer. The matrix having device-dependent image information is transformed in a matrix manipulation device into a corrected matrix having device-dependent image information. A printing form is exposed in the printing form exposer with the image information in accordance with the corrected matrix. Here, a first part of the transformation rule for producing the corrected matrix in a first zone of the matrix is defined as a function of the area coverage of the first zone, and a second part of the transformation rule for producing the corrected matrix in a second zone of the matrix, which is different from the first zone, is defined as a function of the area coverage of the second zone, the area coverage in the first zone and the area coverage in the second zone being different from each other.

17 Claims, 2 Drawing Sheets

METHOD FOR EXPOSING A PRINTING FORM AND CORRESPONDING COMPUTER PROGRAM PRODUCT

CROSS-REFERENCE TO RELATED APPLICATION

This application claims the priority, under 35 U.S.C. §119, of German patent application No. 10 2008 058 719.2, filed Nov. 24, 2008; the prior application is herewith incorporated by reference in its entirety.

BACKGROUND OF THE INVENTION

Field of the Invention

The invention relates to a method for exposing a printing form wherein a matrix having device-dependent image information is provided on a computer for supplying data to a printing form exposer, the matrix with the device-dependent image information is transformed in a matrix manipulation device into a corrected matrix having device-dependent image information, and the printing form is exposed in the printing form exposer with the image information in accordance with the corrected matrix.

During the transfer of information to a printing material in a subject, be it images or texts, geometric errors can occur, so that the subject exhibits a difference from a desired geometry in terms of position and/or shape. A source which occurs particularly frequently in practice, in particular in offset printing, is paper deformation, which manifests itself in the distortion of the subject. These distortions are primarily disruptive in multicolor printing, often even visible, when individual color separations are overprinted on the printing material with distortions which differ from one another quantitatively and/or qualitatively.

For example, U.S. Pat. No. 6,024,504 and its German counterpart published patent application DE 197 24 066 A1 describe a method for the correction of geometric errors, such as circumferential register errors, printing length or printing width errors, subject rotations, trapezoidal distortions and the like, during the transfer of information to a printing material. A device-dependent matrix, created from a device-independent description of the information to be printed, in particular a raster image bit map, is fed to a matrix manipulation device. There, elements of the matrices are subjected to a corrective transformation as a function of parameter values from a database generated previously by measurement, before said elements are fed to a digital imaging unit.

Although point by point correction is provided, the general illustration of this procedure in U.S. Pat. No. 6,024,504 and DE 197 24 066 A1 relates to geometric errors which are caused by parameters whose effects act globally on the entire subject. Typically, these are machine-specific or process-specific parameters, in particular also consequences arising from erroneous settings or secondary effects of set process parameters.

SUMMARY OF THE INVENTION

It is an object of the invention to provide a method as summarized above and a corresponding computer program product which avoid the short-comings of the prior art and provides for an improved method for exposing a printing form in which geometric errors caused by the subject-dependent parameters of the coloration can be corrected.

With the above and other objects in view there is provided, in accordance with the invention, a method of exposing a printing form, which comprises the following method steps:
providing a matrix having device-dependent image information on a computer for supplying data to a printing form exposer;
transforming the matrix having device-dependent image information in a matrix manipulation device into a corrected matrix having device-dependent image information, and thereby:
defining a first part of a transformation rule for producing the corrected matrix in a first zone of the matrix as a function of an area coverage of the first zone;
defining a second part of the transformation rule for producing the corrected matrix in a second zone of the matrix, which is different from the first zone, as a function of an area coverage of the second zone;
the area coverage in the first zone and the area coverage in the second zone being different from each other; and
exposing the printing form in a printing form exposer with the image information according to the corrected matrix.

In other words, the method according to the invention for exposing a printing form, in particular for offset printing, comprises at least the following steps. A matrix, in particular an original matrix, having device-dependent image information is provided on a computer for supplying data to a printing form exposer. The matrix having device-dependent image information is transformed in a matrix manipulation device into a corrected matrix having device-dependent image information. A printing form is exposed in the printing form exposer with the image information in accordance with the corrected matrix. In this case, a first part of the transformation rule for producing the corrected matrix in a first zone of the matrix is defined as a function of the area coverage of the first zone, and a second part of the transformation rule for producing the corrected matrix in a second zone of the matrix, which is different from the first zone, is defined as a function of the area coverage of the second zone, the area coverage in the first zone and the area coverage in the second zone being different from each other.

The subject can also be designated as a printing image. A subject can have image and/or text constituents. The area coverage depends on the subject in accordance with the coloration to be carried out. Individual zones on a printing form can correspond to regions which, in a printing unit having an inking unit which has a plurality of ink metering elements, are in each case assigned to one of the ink metering elements.

Narrower printing and, respectively, wider printing designate the fact that a difference occurs in the printing widths of the various color separations during multicolor printing in a machine run, in particular in a sheet-processing press. Shorter printing and, respectively, longer printing designate the fact that a difference occurs in the printing lengths of the various color separations during multicolor printing in a machine run, in particular in a sheet-processing press. Round printing designates the fact that differences occur in lines running transversely with respect to the printing direction in the individual color separations during multicolor printing in a machine run, in particular in a sheet-processing press. Both narrower printing and wider printing and also shorter printing and longer printing and also round printing can be caused by the subject to be printed, it being possible for these effects to be particularly highly pronounced, in particular in offset printing. These printing defects described occur to a different extent in individual zones in which area coverages that are different from one another have to be printed. With the method according to the invention, these subject-induced printing defects can advantageously be compensated or avoided by means of an opposing, preventive measure.

In the method according to the invention, one zone of the matrix preferably corresponds to that part of a subject to be printed which is assigned to exactly one zone of a zonal inking unit of a press. Furthermore, the magnitude of the area coverage can be transmitted to the matrix manipulation device by supplying a value of a measure of the area coverage. In particular, the measure used for the area coverage in a zone can be the inking zone preset value for the presetting of an ink metering element in the associated zone of a zonal inking unit of the press.

The area coverage values present in the individual zones are commonly already determined for the presetting of the ink metering elements in the individual zones, so that presetting data is present at the pre-press stage and/or in the control system of a press. These variables, which have a unique functional relationship, therefore advantageously constitute a measure of the area coverage, since no additional measurements or calculations have to be made.

Alternatively or additionally, in the method according to the invention the area coverage in the first zone and the area coverage in the second zone can be calculated or have been calculated from the properties of the print job.

It is above all preferred for the method to be applied to a large number of zones, in particular to all zones.

In a particularly preferred embodiment of the method according to the invention, a profile existing for a large number of adjacent zones of the values of the measures of the area coverage is smoothed by means of a mathematical calculation operation. For instance, the calculation operation is advantageously an interpolation with the aid of spline functions.

At least one of the parts of the transformation rule can further depend on at least one operating parameter of the press and/or at least one material parameter of the consumable materials and/or at least one environmental parameter of the press.

In an automated embodiment of the method according to the invention, at least one first current value of a measure of the area coverage in a first zone of the matrix, and a second current value of a measure of the area coverage in a second zone of the matrix, are provided on the computer or on the matrix manipulation device, and the first part of the transformation rule for producing the corrected matrix in the first zone and the second part of the transformation rule for producing the corrected matrix in the second zone are selected from a collection of transformation rules in a data structure.

In practical terms, in the method according to the invention the matrix manipulation device can be a control device of the printing form exposer or the computer for supplying data to the printing form exposer.

The matrix having device-dependent image information can be produced in a raster image processor or can have been produced by a raster image processor.

In a further development of the method according to the invention, paper expansion compensation of the input data of the raster image processor is carried out during the production of the matrix in the raster image processor.

Furthermore, the data structure can be stored in a computer of the press, in the computer for supplying data to a printing form exposer or in the matrix manipulation device. Additionally or alternatively to the other features described above, at least one transformation rule in the collection can been defined on the basis of measurements of the printed result in the case of the value of the measure of the area coverage in order to reduce the defects occurring in the printed result.

Finally, the provision of the first value of the measure of the area coverage in a first zone and of the second value of the measure of the area coverage in a second zone can also comprise an entry by means of an operating element or a measurement of the current parameter.

With the above and other objects in view there is also provided, in accordance with the invention, a computer program product, to be loaded directly into an internal memory of a digital computer and/or stored on a computer-compatible medium. According to the invention, the computer program product comprises software code sections with which all the steps of a method according to this illustration are carried out when the product runs on a computer.

Other features which are considered as characteristic for the invention are set forth in the appended claims.

Although the invention is illustrated and described herein as embodied in method for exposing a printing form, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
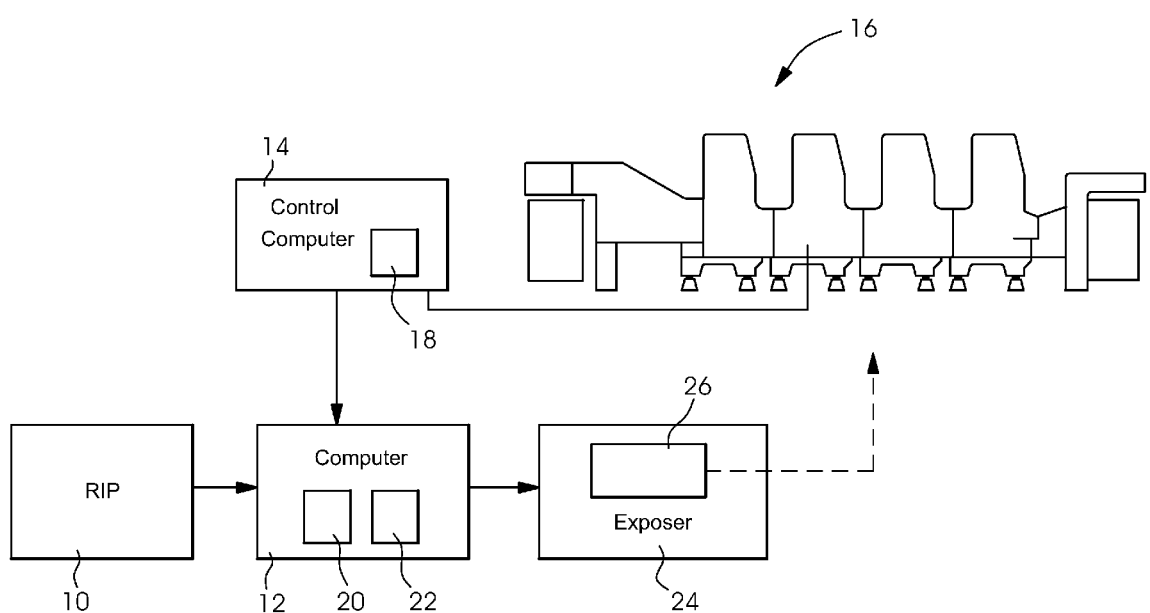
FIG. 1 shows a schematic illustration of the topology of an embodiment of devices from the prepress stage and the printing stage being linked, with which devices the method according to the invention for exposing a printing form can be carried out.

Referring now to the figures of the drawing in detail and first, in particular, FIG. 1 thereof, there is shown a schematic illustration of the topology of an embodiment of devices from the prepress stage and the printing stage being linked, with which devices the method according to the invention for exposing a printing form can be carried out.

In a raster image processor 10, a matrix having device-dependent image information, a raster bit map, is produced from a data structure having device-independent image information, for example in Postscript or Portable Data Format. In this embodiment, paper expansion compensation of the input data is carried out in the raster image processor. The raster bit map is provided on a computer 12 for supplying data to a printing form exposer 24. The computer 12 likewise has a data exchange connection to a control computer 14 of a press 16. The latter is, in particular, preferably a sheet fed offset press. The press 16 has a plurality of printing units each having a zonal inking unit. The control computer 14 has a data set relating to a print job 18. In relation to this print job 18 there exist parameters which are relevant to the printing form production. Parameters are, in particular, the inking zone preset values mentioned above for the presetting of the ink metering elements in the zones of a zonal inking unit of the press. These inking zone preset values are provided on the computer 12 for supplying data to the printing form exposer 24. On the computer 12 there exists a matrix manipulation device 20 in the form of a function of a computer program, so that, following the selection according to the invention of a transformation rule from a data structure 22, a database, the raster bit map is converted into a corrected raster bit map as a function of the current values of the parameters transmitted by the control computer. In the printing form exposer 24, for example a thermal offset printing plate exposer, a printing form 26, for example a thermal offset printing plate, is finally imaged in accordance with the corrected raster bit map. The process is carried out in a corresponding way for all the printing forms of a set for the multicolor printing. The printing forms obtained in this way are used for processing the print job 18 in the press 16.

Figure 2:
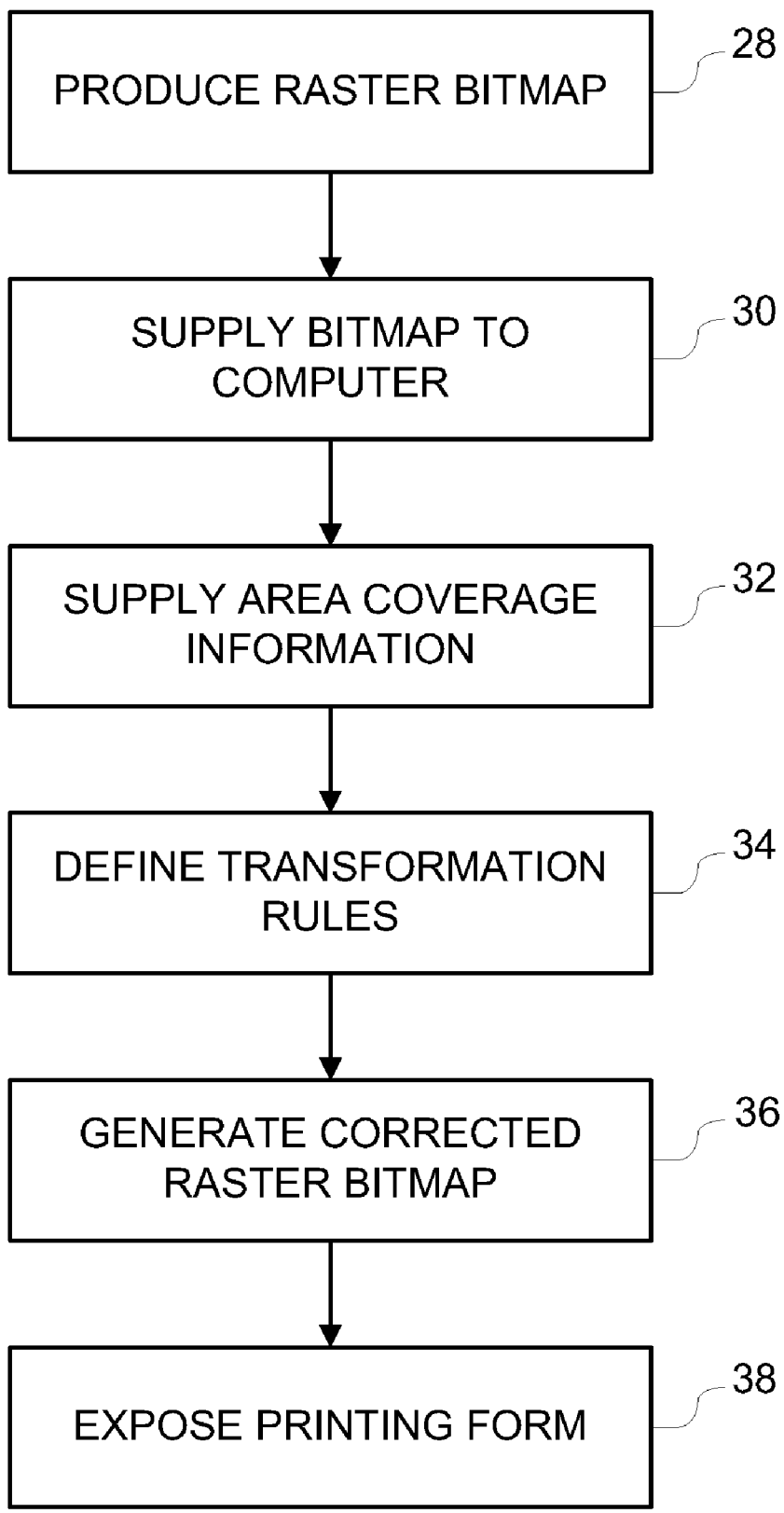
FIG. 2 shows a flowchart of an embodiment of the method according to the invention for exposing a printing form.

FIG. 2 is a flowchart of a preferred embodiment of the method according to the invention for exposing a printing form. In this preferred embodiment, the production 28 of a raster bit map is carried out in a first step, paper expansion compensation being carried out. In a second step 30, the raster bit map thus obtained is made available to a computer for supplying data to a printing form exposer. According to the invention, in a third step of the provision 32 of the values of the measures of the area coverage, information about the coloration which occurs in individual zones of the print job to which the raster bit map is assigned is transmitted to the computer. In this case, the practical values in the individual zones generally differ from one another. Depending on the values, in a fourth step in which transformation rules are defined (definition of rules 34), it is determined which respective rule is to be used for the conversion of the raster bit map in the individual zones in order that the values occurring for the area coverage are matched. In a fifth step, the transformation of the raster bit map 36, a corrected raster bit map is created, a first part of the transformation rule for producing the corrected matrix as a function of the area coverage of the first zone being used in a first zone of the matrix, and a second part of the transformation rule for producing the corrected matrix as a function of the area coverage of the second zone being used in a second zone of the matrix, which is different from the first zone. In a sixth step, the step of exposing the printing form 38, this corrected raster bit map forms the basis for the imaging.

Finally, we provide a calculation example: For a process color separation, the following examples of inking zone preset values in 10 zones, for example, are present: [0 0 12 12 12 9 4 5 4 0]. From this, a profile containing 10 values is calculated with the stipulation that the maximum value of two adjacent inking zone preset values in each case is taken. The edge values are accepted directly. In this way, the profile [0 0 12 12 12 9 5 5 5 0] is obtained, which is used as a measure of the area coverage input into the above-described method according to the invention.

The invention claimed is:

1. A method of exposing a printing form, which comprises the following method steps:
providing a matrix having device-dependent image information on a computer for supplying data to a printing form exposer;
transforming the matrix having device-dependent image information in a matrix manipulation device into a corrected matrix having device-dependent image information, and thereby:
defining a first part of a transformation rule for producing the corrected matrix in a first zone of the matrix as a function of an area coverage of the first zone;
defining a second part of the transformation rule for producing the corrected matrix in a second zone of the matrix, which is different from the first zone, as a function of an area coverage of the second zone;
the area coverage in the first zone and the area coverage in the second zone being different from each other; and
exposing the printing form in a printing form exposer with the image information according to the corrected matrix.

2. The method for exposing a printing form according to claim 1, which comprises defining a zone of the matrix to correspond to that part of a subject to be printed which is assigned to exactly one zone of a zonal inking unit of a press.

3. The method for exposing a printing form according to claim 1, which comprises transmitting a magnitude of the area coverage to the matrix manipulation device by supplying a value of a measure of the area coverage.

4. The method for exposing a printing form according to claim 3, wherein the measure used for the area coverage in a zone is the inking zone preset value for the pre-setting of an ink metering element in the associated zone of a zonal inking unit of the press.

5. The method for exposing a printing form according to claim 1, which comprises calculating the area coverage in the first zone and the area coverage in the second zone from properties of the given print job.

6. The method for exposing a printing form according to claim 1, which comprises applying the method steps to a multiplicity of zones.

7. The method for exposing a printing form according to claim 6, which comprises smoothing a profile existing for a large number of adjacent zones of the values of the measures of the area coverage by way of a mathematical calculation operation.

8. The method for exposing a printing form according to claim 7, wherein the mathematical calculation is an interpolation with the aid of spline functions.

9. The method for exposing a printing form according to claim 1, wherein at least one of the parts of the transformation rule further depends on one or more parameters selected from the group of at least one operating parameter of the press, at least one material parameter of consumable materials, and at least one environmental parameter of the press.

10. The method for exposing a printing form according to claim 1, which comprises:
providing on the computer or on the matrix manipulation device at least one first current value of a measure of the area coverage in a first zone of the matrix, and a second current value of a measure of the area coverage in a second zone of the matrix; and
selecting the first part of the transformation rule for producing the corrected matrix in the first zone and the second part of the transformation rule for producing the corrected matrix in the second zone from a collection of transformation rules in a data structure.

11. The method for exposing a printing form according to claim 1, wherein the matrix manipulation device is a control device of the printing form exposer or the computer for supplying data to the printing form exposer.

12. The method for exposing a printing form according to claim 1, which comprises generating the matrix having device-dependent image information in a raster image processor.

13. The method for exposing a printing form according to claim 12, wherein the step of generating the matrix in the raster image processor includes carrying out paper expansion compensation of the input data of the raster image.

14. The method for exposing a printing form according to claim 1, which comprises storing the data structure in a computer of the press, in the computer for supplying data to the printing form exposer, or in a matrix manipulation device.

15. The method for exposing a printing form according to claim 1, which comprises defining at least one transformation rule in a collection thereof on the basis of measurements of a printed result in the case of the value of the measure of the area coverage in order to reduce defects occurring in the printed result.

16. The method for exposing a printing form according to claim 1, wherein the first value of the measure of the area coverage in a first zone and the second value of the measure of the area coverage in a second zone is provided by way of an entry from an operating element or a measurement of a current parameter.

17. A computer-readable medium having stored thereon a computer program in non-transitory form, the program to be loaded directly into an internal memory of a digital computer and comprising software code sections for carrying out the steps of the method according to claim 1 when the software code is executed on the computer.

* * * * *